(12) United States Patent
Washio et al.

(10) Patent No.: US 8,903,724 B2
(45) Date of Patent: Dec. 2, 2014

(54) SPEECH RECOGNITION DEVICE AND METHOD OUTPUTTING OR REJECTING DERIVED WORDS

(75) Inventors: Nobuyuki Washio, Kawasaki (JP); Shouji Harada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 302 days.

(21) Appl. No.: 13/363,411

(22) Filed: Feb. 1, 2012

(65) Prior Publication Data

US 2012/0239402 A1  Sep. 20, 2012

(30) Foreign Application Priority Data

Mar. 15, 2011  (JP) ................................. 2011-056495

(51) Int. Cl.
*G10L 15/08* (2006.01)
*G10L 15/02* (2006.01)

(52) U.S. Cl.
CPC ........... *G10L 15/02* (2013.01); *G10L 2015/088* (2013.01)
USPC ............ 704/252; 704/236; 704/257; 707/765

(58) Field of Classification Search
CPC .... G10L 15/02; G10L 15/08; G10L 2015/088
USPC .......... 704/231, 236, 251, 252, 257; 707/765, 707/766, 767
See application file for complete search history.

(56) References Cited

U.S. PATENT DOCUMENTS

| | | | | |
|---|---|---|---|---|
| 5,471,677 A | * | 11/1995 | Imanaka | 707/694 |
| 7,225,127 B2 | * | 5/2007 | Lucke | 704/257 |
| 7,624,014 B2 | * | 11/2009 | Stewart et al. | 704/251 |
| 7,962,338 B2 | * | 6/2011 | Harada | 704/251 |
| 7,983,915 B2 | * | 7/2011 | Knight et al. | 704/254 |
| 8,145,662 B2 | * | 3/2012 | Chen et al. | 707/767 |
| 8,380,505 B2 | * | 2/2013 | Konig et al. | 704/251 |
| 8,392,443 B1 | * | 3/2013 | Allon et al. | 707/765 |
| 2006/0106604 A1 | * | 5/2006 | Okimoto | 704/243 |

(Continued)

FOREIGN PATENT DOCUMENTS

| | | |
|---|---|---|
| EP | 0947980 | 10/1999 |
| JP | 08-235191 | 9/1996 |

(Continued)

OTHER PUBLICATIONS

Japanese Office Action dated Sep. 30, 2014 in corresponding Japanese Patent Application No. 2011-056495.

*Primary Examiner* — Martin Lerner
(74) *Attorney, Agent, or Firm* — Staas & Halsey LLP

(57) ABSTRACT

A speech recognition device includes, a speech recognition section that conducts a search, by speech recognition, on audio data stored in a first memory section to extract word-spoken portions where plural words transferred are each spoken and, of the word-spoken portions extracted, rejects the word-spoken portion for the word designated as a rejecting object; an acquisition section that obtains a derived word of a designated search target word, the derived word being generated in accordance with a derived word generation rule stored in a second memory section or read out from the second memory section; a transfer section that transfers the derived word and the search target word to the speech recognition section, the derived word being set to the outputting object or the rejecting object by the acquisition section; and an output section that outputs the word-spoken portion extracted and not rejected in the search.

20 Claims, 12 Drawing Sheets

(56) References Cited

U.S. PATENT DOCUMENTS

| | | | |
|---|---|---|---|
| 2006/0173682 A1* | 8/2006 | Manabe et al. | 704/246 |
| 2008/0208566 A1* | 8/2008 | Alonichau | 704/9 |
| 2009/0043581 A1* | 2/2009 | Abbott et al. | 704/254 |
| 2009/0106023 A1* | 4/2009 | Miki | 704/245 |
| 2009/0248412 A1* | 10/2009 | Washio | 704/246 |
| 2010/0010813 A1* | 1/2010 | Harada | 704/249 |
| 2010/0114574 A1* | 5/2010 | Liu et al. | 704/251 |
| 2011/0225155 A1* | 9/2011 | Roulland et al. | 707/737 |
| 2012/0209606 A1* | 8/2012 | Gorodetsky et al. | 704/235 |
| 2012/0209883 A1* | 8/2012 | Tsutsui et al. | 707/779 |

FOREIGN PATENT DOCUMENTS

| | | |
|---|---|---|
| JP | 3105863 | 11/2000 |
| JP | 2002-091493 | 3/2002 |
| JP | 2003-330491 | 11/2003 |
| JP | 2006-154658 | 6/2006 |

* cited by examiner

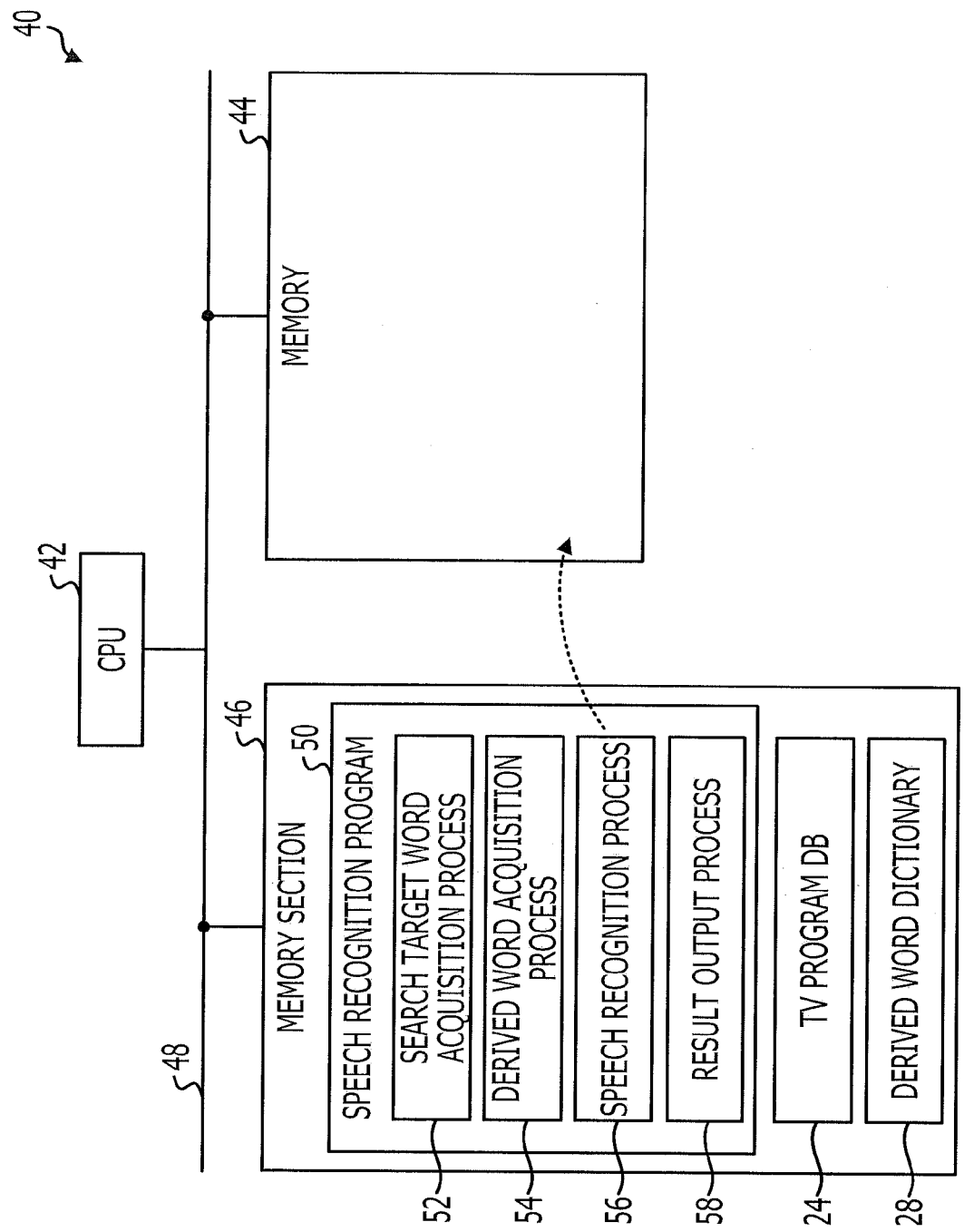

FILE,START,END,KEYWORD,SCORE
PROG1988_04_10_2200, 2:50, 2:51, represented, 95
PROG1988_04_10_2200, 4:22, 4:23, represents, 88
PROG1911_11_22_1855, 12:50, 12:51, representing, 85
PROG1988_12_10_0715, 9:10, 9:11, represent, 78
⋮

FIG. 7A

FIRST RECOGNITION
DICTIONARY

| represent |

16

SECOND RECOGNITION
DICTIONARY

| REJECT: representation |
| REJECT: representative |
| REJECT: representability |
| ⋮ |

FIRST RECOGNITION
DICTIONARY

| represent |

16

SECOND RECOGNITION
DICTIONARY

| REJECT: representation |
| REJECT: representative |
| REJECT: representability |
| OUTPUT: represented |
| OUTPUT: represents |
| OUTPUT: representing |
| ⋮ |

~18

SPEECH RECOGNITION DEVICE AND METHOD OUTPUTTING OR REJECTING DERIVED WORDS

CROSS-REFERENCE TO RELATED APPLICATION

This application is based upon and claims the benefit of priority of the prior Japanese Patent Application No. 2011-56495, filed on Mar. 15, 2011, the entire contents of which are incorporated herein by reference.

FIELD

The embodiments discussed herein are related to a speech recognition device, a speech recognition method and a computer-readable storage medium storing a speech recognition program.

BACKGROUND

Word spotting is a technology to extract, by the use of speech recognition, portions of audio sound in which one of plural words registered in a dictionary is spoken from the audio sound represented by audio data. For example, by registering only a search target word in a dictionary, the technology enables a portion of audio sound where the search target word is spoken to be extracted. Accordingly, the technology may be utilized for information search on audio sound. However, unlike a typical character string search on text data, there is the possibility of having a recognition error because the waveform may differ for different speakers even if they speak the same word.

With regard to the speech recognition, various technologies are proposed to improve the recognition ratio. For example, there is a known technology that generates words which are similar to recognition target vocabulary but prone to cause recognition errors in the phoneme level, and uses those generated similar words as rejecting vocabulary. Furthermore, Japanese Laid-open Patent Publication Nos. 2003-330491 and 2006-154658 disclose technologies that evaluate the possibility of recognition error by analyzing a speech-recognized word and limit the number of rejecting words to be generated as the possibility of recognition error of the speech-recognized word becomes higher.

SUMMARY

In accordance with an aspect of the embodiments, a speech recognition device includes, a speech recognition section that conducts a search, by speech recognition, on audio data stored in a first memory section to extract word-spoken portions where plural words transferred are each spoken and, of the word-spoken portions extracted, rejects the word-spoken portion for the word designated as a rejecting object; an acquisition section that obtains a derived word of a designated search target word, the derived word being generated in accordance with a derived word generation rule stored in a second memory section or read out from the second memory section where the derived word is stored in association with the search target word, and sets the derived word to an outputting object or the rejecting object according to setting designation information or a user's instruction, the setting designation information being stored in the second memory section and indicating whether the derived word is the outputting object or the rejecting object; a transfer section that transfers the derived word and the search target word to the speech recognition section, the derived word being set to the outputting object or the rejecting object by the acquisition section; and an output section that outputs the word-spoken portion extracted and not rejected in the search of the speech recognition section.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 2 is a schematic block diagram of a computer functioning as a speech recognition device;

FIG. 7A and FIG. 7B are schematic diagrams illustrating examples of a search target word to be registered in a first recognition dictionary and examples of derived words to be registered in a second recognition dictionary;

DESCRIPTION OF EMBODIMENTS

Embodiments of the disclosed technology are described below with reference to the drawings.

Figure 1:
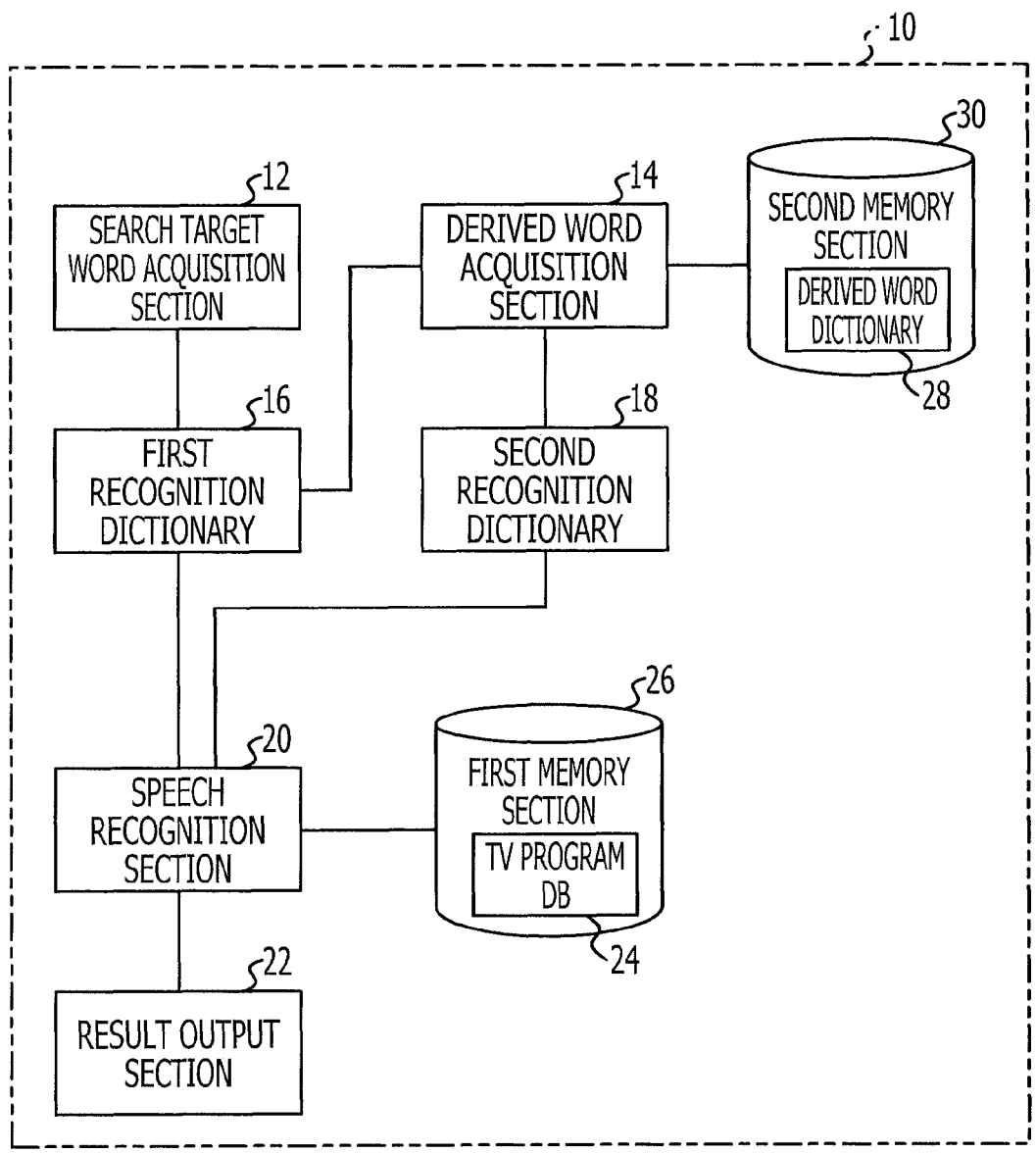
FIG. 1 is a function block diagram of a speech recognition device that will be described in a first embodiment.

A first embodiment will now be described. FIG. 1 illustrates a speech recognition device 10 according to the first embodiment. The speech recognition device 10 executes processing that searches and extracts a portion of audio data where a search target word is spoken. The speech recognition device 10 includes a search target word acquisition section 12, a derived word acquisition section 14, a first recognition dictionary 16, a second recognition dictionary 18, a speech recognition section 20, a result output section 22, a first memory section 26 storing a TV program DB (database) 24 and a second memory section 30 storing a derived word dictionary 28.

The speech recognition device 10 may be realized by, for example, a computer 40 illustrated in FIG. 2. The computer 40 includes a CPU 42, a memory 44 and a nonvolatile memory section 46, and these parts are connected each other via a bus 48. The memory section 46 may be realized by a HDD (Hard Disk Drive), a flash memory, etc. The memory section 46, which serves as a storage medium, stores a speech recognition program 50 for making the computer 40 function as the speech recognition device 10, the TV program DB 24 and the derived word dictionary 28. The CPU 42 reads out the speech recognition program 50 from the memory section 46, loads it into the memory 44, and sequentially executes processes included in the speech recognition program 50.

The speech recognition program 50 includes a search target word acquisition process 52, a derived word acquisition process 54, a speech recognition process 56 and a result output process 58. The CPU 42 operates as the search target word acquisition section 12 illustrated in FIG. 1 by executing the search target word acquisition process 52. The CPU 42 also operates as the derived word acquisition section 14 illustrated in FIG. 1 by executing the derived word acquisition process 54. The CPU 42 further operates as the speech recognition section 20 illustrated in FIG. 1 by executing the speech recognition process 56. The CPU 42 further operates as the result output section 22 illustrated in FIG. 1 by executing the result output process 58.

When the speech recognition device 10 is realized by the computer 40, the memory section 46 storing the TV program DB 24 and the derived word dictionary 28 is used as the first memory section 26 and the second memory section 30, and part of the memory 44 is used as the first recognition dictionary 16 and the second recognition dictionary 18. According to the above configuration, the computer 40 executing the speech recognition program 50 functions as the speech recognition device 10. In the above, there is described an example in which the speech recognition program 50 is read out from the memory section 46. Alternatively, the speech recognition program 50 may be read out from, for example, an arbitrary storage medium such as a CD-ROM, a DVD-ROM, etc., before the execution.

The search target word acquisition section 12 obtains the search target word designated by a user. The search target word acquisition section 12 may be configured, for example, such that the designated search target word is obtained via an input device that is connected to the computer 40 and receives an input operation of the user. Alternatively, the search target word acquisition section 12 may be formed, for example, as a communication unit that obtains the designated search target word through communications with an outside information processing apparatus which is provided with an input device for designating the search target word. In the case where the search target word acquisition section 12 is the above communication unit, the computer 40 functioning as the speech recognition device 10 may be configured, for example, such that the computer 40 is connected with the outside information processing apparatus through a communication channel such as a LAN (Local Area Network), the Internet, etc.

The search target words obtained by the search target word acquisition section 12 are registered in the first recognition dictionary 16, and the first recognition dictionary 16 retains those registered search target words. The first recognition dictionary 16 may be realized by, for example, part of the memory area of the memory 44 of the computer 40, which is assigned to be used as the first recognition dictionary 16. Alternatively, instead of using the memory area of the memory 44, a memory area of the memory section 46 may be used for the first recognition dictionary 16.

The derived word acquisition section 14 obtains derived words of the search target word (for example, words generated by adding an affix to the search target word, etc.), which is obtained by the search target word acquisition section 12 and retained in the first recognition dictionary 16, based on information registered in the derived word dictionary 28 stored in the second memory section 30. In the first embodiment, rules generating the derived words are registered in the derived word dictionary 28, and the derived word acquisition section 14 obtains derived words by generating the derived words according to those rules. The details will be described below. Furthermore, the derived word acquisition section 14 sets output/reject information to each of the derived words obtained based on information registered in the derived word dictionary 28. The output/reject information represents whether the corresponding derived word is an outputting object, of which the result of speech recognition is output, or a rejecting object, of which the result of speech recognition is rejected. FIG. 1 illustrates the configuration in which the search target word is input from the first recognition dictionary 16 to the derived word acquisition section 14. Alternatively, the configuration may be such that the search target word is input from the search target word acquisition section 12 to the derived word acquisition section 14. The derived word acquisition section 14 functions as an example of an acquisition section of the disclosed technology.

The derived word and the output/reject information obtained by the derived word acquisition section 14 are registered in the second recognition dictionary 18, and the second recognition dictionary 18 retains those registered derived words and output/reject information. The second recognition dictionary 18 may be realized by, for example, part of the memory area of the memory 44 of the computer 40, which is assigned to the second recognition dictionary 18. Alternatively, instead of using the memory area of the memory 44, a memory area of the memory section 46 may be used for the second recognition dictionary 18. Together with the aforementioned first recognition dictionary 16, the second recognition dictionary 18 functions as an example of a transfer section of the disclosed technology.

The first memory section 26 stores audio data. In the present embodiment, video (moving picture) data of a TV program, to which audio sound is added as data, is used as an example of the audio data. The TV program DB 24 stored in the first memory section 26 includes the video data for a plurality of TV programs. Alternatively, only audio data may be stored instead of the video data. Stored data may be in analog or digital form. When the analog data is stored, an analog-to-digital conversion may be performed before inputting it to the speech recognition section 20. Typically, in the speech recognition process, input audio data is acoustically analyzed and converted into a characteristic parameter such as MFCC, etc. Accordingly, data in the TV program DB 24 may be converted to the characteristic parameter in advance.

The speech recognition section 20 reads in the search target word from the first recognition dictionary 16 and the derived words and corresponding output/reject information from the second recognition dictionary 18. Furthermore, by the use of speech recognition, the speech recognition section 20 searches and extracts portions of TV program's video data of the TV program DB 24, where at least the search target word or the derived word is spoken. In the speech recognition, using the search target word and derived word, matching between an input audio sound and an acoustic model, a phoneme directory or the like is performed. The degree of matching is calculated as an evaluation value (score or reliability) by using logarithmic likelihood in a probability model such as HMM (Hidden Markov Model), etc. or a distance, scale, etc. in a template method. The evaluation value calculated is compared with a preset threshold value. The calculation of the evaluation value and the comparison with the threshold value are performed on a portion to be evaluated, which is a portion of the audio sound added to the video data as data. The calculation and the comparison are repeated as the position of the portion moves along the time line. The portion where the evaluation value exceeds the threshold value is detected as the portion where the search target word or the derived word is spoken. Every time the portion where at least the search target word or the derived word is spoken is detected, information of the portion detected (file name of the video data, position on the time-line, detected spoken word, evaluation value, etc.) is stored in the memory 44, etc.

When the word-spoken portion is searched for a plurality of words as described above, it is typical to set the same threshold for different words. However, the derived word registered in the second recognition dictionary 18 tend to have a longer time length, a longer phoneme length, a longer syllable length, etc. than the search target word registered in the first recognition dictionary 16. In the speech recognition performed by the speech recognition section 20, it is expected that the recognition accuracy may improve when the amount of information for discerning a search word from the other words increases as the search word's time length, phoneme length, syllable length, etc. become longer. Accordingly, it is preferable that, in the speech recognition, the speech recognition section 20 gives more preference to the derived word registered in the second recognition dictionary 18 over the search target word registered in the first recognition dictionary 16.

As an example of the preferential processing of the derived word registered in the second dictionary 18 over the search target word registered in the first dictionary 16 in the speech recognition, the speech recognition section 20 according to the present embodiment sets an individual threshold value for each of the words as to which the word-spoken portions are to be detected by the speech recognition. In an exemplary way of setting the threshold values by word, an experiment may be conducted in advance to detect words containing different numbers of phonemes. From the experiment result, an average of the threshold values which deliver the correct recognition rate of more than 80% is calculated by the number of phonemes. Resultant average values may be used as the threshold values by the number of phonemes. As described in the above, the recognition accuracy tends to increase as the phoneme length becomes longer. Accordingly, the threshold values set for the derived words registered in the second recognition dictionary 18 may become relatively lower, and the threshold value set for the corresponding search target word registered in the first recognition directory 16 may become relatively higher. Alternatively, instead of setting the threshold values by the number of phonemes, the threshold value may be set on the basis of at least one of the number of characters, the number of syllables, the number of Moras, an average duration length expected from pronunciation of each of the previously-mentioned variables, etc.

When the search of the word-spoken portion for every word ends, the speech recognition section 20 outputs information of the word-spoken portions detected (file names of the video data, position on the time-line, detected spoken word, evaluation value, etc.) as a search result. The portion (section on the time-line) where the derived word, which is set to as the rejecting object by the output/reject information, is spoken is excluded (rejected) from the outputting objects of the search result even if the other words registered in the first recognition dictionary 16 and the second recognition dictionary 18 are detected as the word-spoken portions.

This method of rejecting vocabulary-to-reject in the second recognition dictionary 18 uses the same basic principle disclosed in Japanese Patent No. 3105863 in which a recognition result is determined as noise and not output when noise words, which are set to as rejecting noise, are detected in the recognition.

The result output section 22 executes a process of outputting a search result obtained by the speech recognition section 20 in such a form that the user may be able to confirm. This process may be such that, for example, first the search result is displayed on a display device as text information and, when a portion to be replayed is selected and an instruction to start a replay is received, audio data of the portion selected is reproduced as audio sound and output from an audio output section. In the present embodiment, the audio sound is added to the video data as data. Accordingly, a process of displaying video is also executed when replaying the selected portion. Alternatively, only the audio sound may be reproduced (output).

Figure 3A:
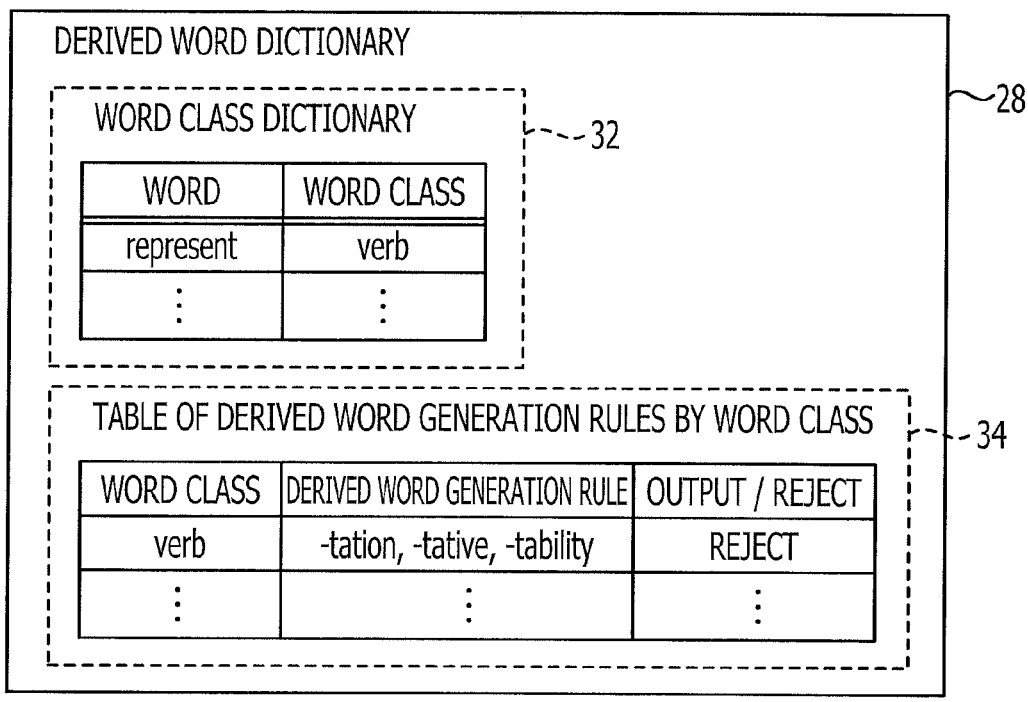
FIG. 3A and FIG. 3B are schematic diagrams illustrating examples of a derived word dictionary.
Figure 3B:
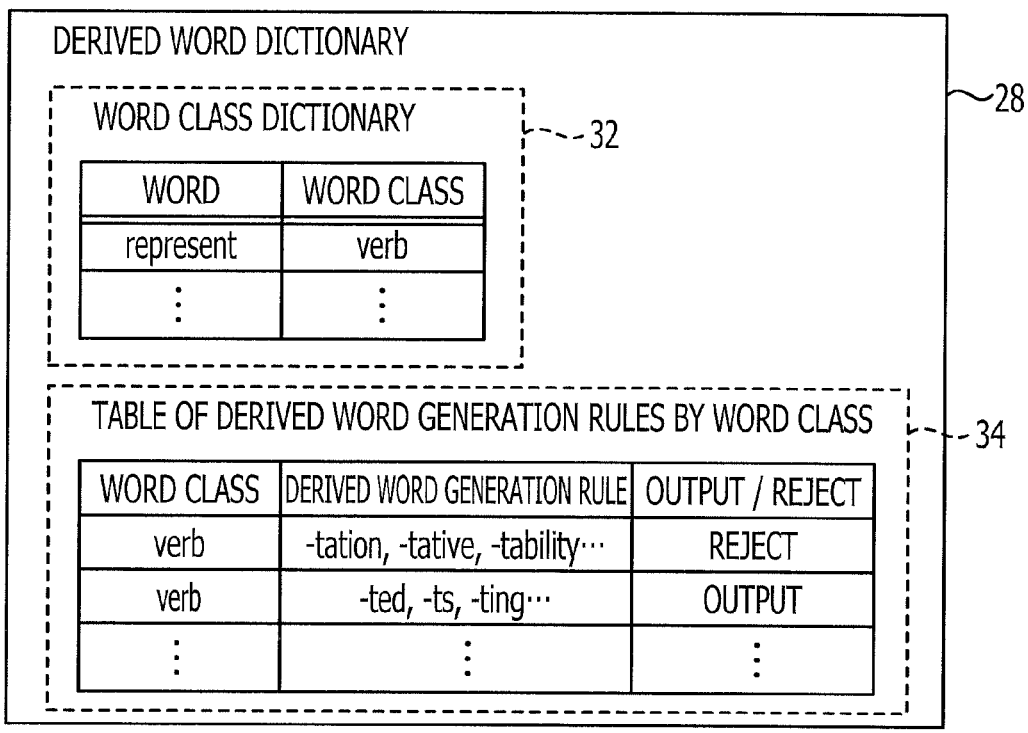

In the first embodiment, the derived word dictionary 28 stored in the second memory section 30 includes a word class dictionary 32 and a table 34 of derived word generation rules by word class as illustrated in FIG. 3A and FIG. 3B. In the word class dictionary 32, readings and the names of word class are respectively registered for a plurality of words. In the table 34 of derived word generation rules by word class, derived word generation rules and setting designation information for designating the setting of the outputting object or the rejecting object are registered in association with the names of word class for a plurality of the word classes.

Alternatively, the search target word and the information to be used in the derived word dictionary 28 may further include other information such as writing, etc. The additional inclusion of writing may enable to make a distinction between words of the same sound but different writing.

The derived word generation rule defines a rule for generating the derived word of the search target word from the search target word. In examples illustrated in FIG. 3A and FIG. 3B, a plurality of the derived word generation rules are registered for each word class.

The search target word and derived word are not limited to any particular language such as Japanese, etc., and the other language such as English, etc. may also be used. The derived word generation rule may be a rule for generating a plural form of a noun as the derived word when the search target word is a singular noun, or for generating a verb in past tense form, progressive form, etc. as the derived word when the search target word is the verb in present tense. Furthermore, the derived word generation rule may not be limited to a rule that adds an affix at the end of the search target word. Alternatively, the derived word generation rule may be a rule that switches a portion of word characters of the search target word to other characters to generate the derived word such as, for example, changing from the search target word "-ity" to the derived word "-ities" or the like. The setting designation information is information that designates whether the derived word generated according to the derived word generation rule is the outputting object or the rejecting object. In the examples of FIG. 3A and FIG. 3B, the setting designation information is set by the word class.

FIG. 3A is an example in which the derived word generation rules and the setting designation information are registered in the table 34 of derived word generation rules by word class. However, other arrangement may also be employed. For example, the derived word generation rules and the setting designation information may be registered by more detailed unit. In an example illustrated in FIG. 3B, the derived words are generated from a word which word class is "verb". Those derived words are divided into a plurality of groups, and the derived word generation rules and the setting designation information are registered for each of the plurality of groups. Alternatively, the table 34 of derived word generation rules by word class may be configured so as that the setting designation information is registered by the derived word generation rule.

Figure 4:
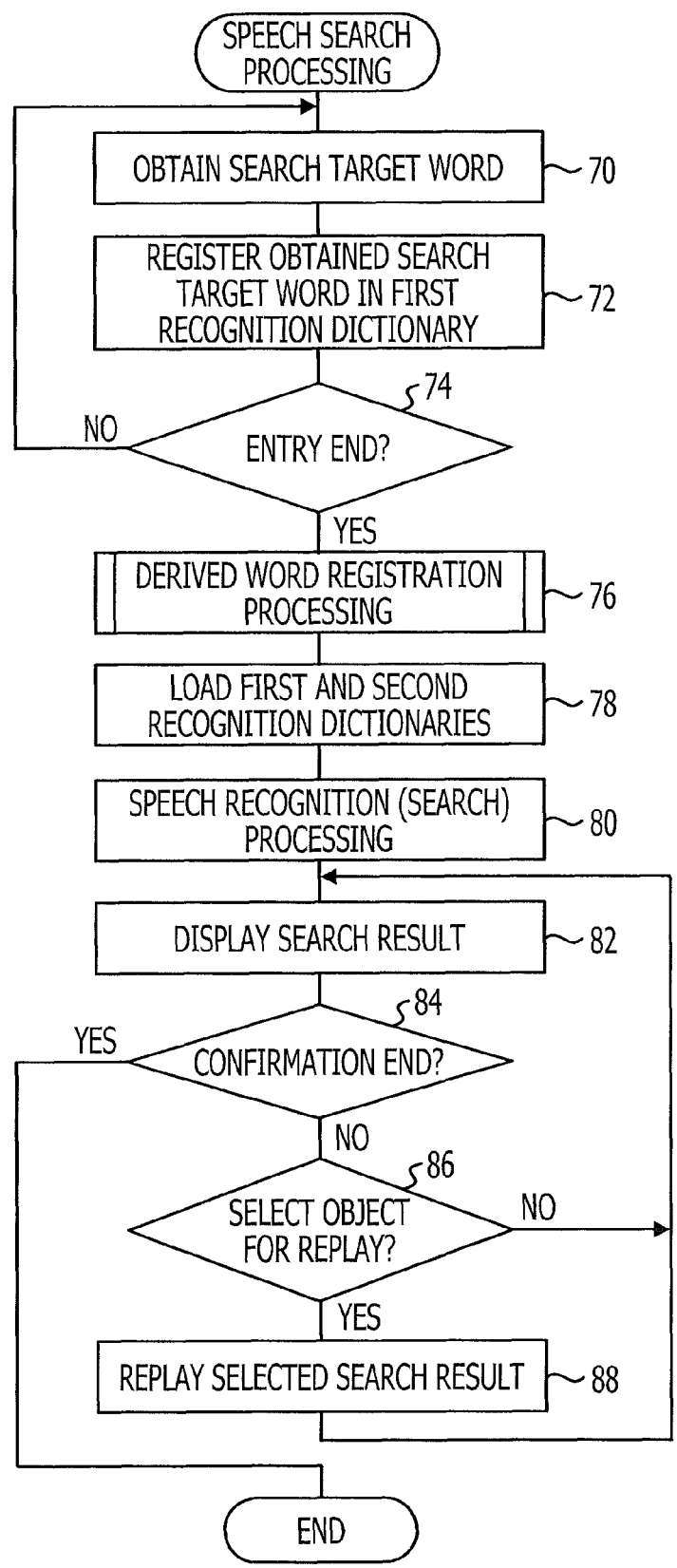
FIG. 4 is a flowchart of speech search processing.

Next, as an operation of the first embodiment, the speech search processing is described with reference to FIG. 4. The speech search processing is performed by the speech recognition device 10 when the CPU 42 executes the speech recognition program 50. In the speech search processing illustrated in FIG. 4, first the search target word acquisition section 12 obtains a single search target word designated by the user (Operation 70), and then registers the single search target word obtained in the first recognition dictionary 16 (Operation 72). Subsequently, the search target word acquisition section 12 determines whether or not all the search target words designated by the user are obtained (Operation 74). When the determination is negative, the obtainment of the search target word and the registration to the first recognition dictionary 16 are repeated. When the obtainment of the search target word ends and the determination in Operation 74 becomes positive, the derived word acquisition section 14 executes the derived word registration processing (Operation 76).

Figure 5:
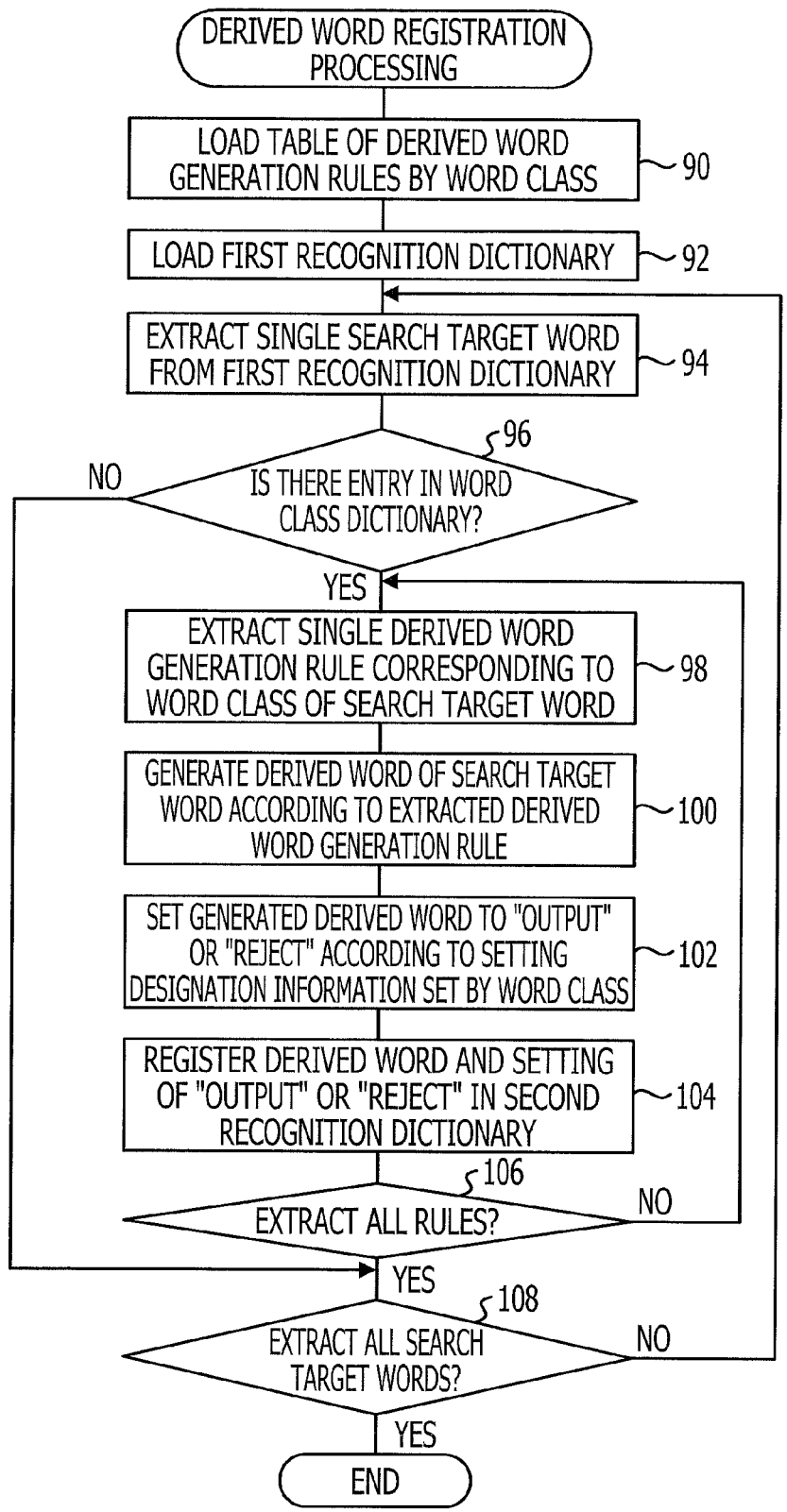
FIG. 5 is a flowchart of derived word registration processing that will be described in the first embodiment.

As illustrated in FIG. 5, in the derived word registration processing, first the derived word acquisition section 14 loads the table 34 of derived word generation rules by word class of the derived word dictionary 28 from the second memory section 30 into the memory 44 (Operation 90). Next, the derived word acquisition section 14 loads the first recognition dictionary 16 into a predetermined area of the memory 44 (Operation 92). Then, the derived word acquisition section 14 extracts a single search target word as the target of processing from the first recognition dictionary 16, which is read in the predetermined area of the memory 44 (Operation 94). Subsequently, the derived word acquisition section 14 conducts a search on the word class dictionary 32 with using the extracted search target word that is the target of processing as the search key, and, based on the result of the search, determines whether or not the extracted search target word is registered in the word class dictionary 32 (Operation 96).

In the case where the extracted search target word is not registered in the word class dictionary 32, the determination in Operation 96 becomes negative and the flow proceeds to Operation 108. In the case where the extracted search target word is registered in the word class dictionary 32, the determination in Operation 96 becomes positive, and the derived word acquisition section 14 reads the word class name, which is registered in the word class dictionary 32 in association with the search target word, into the memory 44. Next, the derived word acquisition section 14 conducts a search on the table 34 of derived word generation rules by word class, which is read in the previous operation, Operation 90, with using the word class name of the search target word as the search key. Subsequently, the derived word acquisition section 14 extracts one derived word generation rule from the table 34 of derived word generation rules by word class in which the derived word generation rules are registered in association with word class names of the search target words (Operation 98).

Next, the derived word acquisition section 14 generates the derived word of the search target word, which is the target of processing, according to the derived word generation rule extracted from the table 34 of derived word generation rules by word class in Operation 98 (Operation 100). Next, the derived word acquisition section 14 extracts the setting designation information registered in the table 34 of derived word generation rules by word class in association with the word class name of the search target word that is the target of processing. Then, the derived word acquisition section 14 sets the output/reject information for the derived word of the search target word generated in Operation 100. The output/reject information determines whether the corresponding derived word is the outputting object or the rejecting object in accordance with the setting designation information extracted. Furthermore, the derived word acquisition section 14 registers the derived word of the search target word generated in Operation 100 and the output/reject information set in Operation 102 in the second recognition dictionary 18 (Operation 104). The derived word and the output/reject information are registered in association with each other.

Next, the derived word acquisition section 14 determines whether or not all the derived word generation rules, which correspond to the word class of the search target word that is the target of processing, are extracted from the table 34 of derived word generation rules by word class (Operation 106). When the determination is negative, the flow returns to Operation 98, and the extraction of the derived word generation rule, the generation of the derived word, the setting of the output/reject information, and the registration thereof to the second recognition dictionary 18 are repeated.

When all the derived word generation rules corresponding to the word class of the search target word that is the target of processing are extracted, the determination in Operation 106 becomes positive and the flow proceeds to Operation 108. In Operation 108, the derived word acquisition section 14 determines whether or not all the search target words are extracted from the first recognition dictionary 16 (Operation 108). When the determination is negative, the flow returns to Operation 94, and the derived word acquisition section 14 extracts another single search target word from the first recognition dictionary 16 as a new target of processing and repeats the aforementioned processing on the search target word that becomes the new target of processing. When the generation of the derived word, the setting of the output/reject information and the registration thereof to the second recognition dictionary 18 are completed for every search target word registered in the first recognition dictionary 16, the determination in Operation 108 becomes positive and the derived word registration processing ends.

When the derived word registration processing ends and the derived words and output/reject information are registered in the second recognition dictionary 18, the speech recognition section 20 loads the search target words from the first recognition dictionary 16 as well as the derived words and the output/reject information from the second recognition dictionary 18 (Operation 78). Furthermore, the speech recognition section 20 executes speech recognition processing that searches and extracts every portion of TV program's video data in the TV program DB 24, where at least the search target word or the derived word read in is spoken, by the use of speech recognition (Operation 80). In this speech recognition processing, the threshold values are set correspondingly to the number of phonemes as described in the above. Accordingly, the word-spoken portion for the derived word registered in the second recognition dictionary 18 is detected with a relatively lower threshold value than that of the search target word registered in the first recognition dictionary 16. The speech recognition section 20 outputs the search result when the speech recognition processing ends. However, the word-spoken portion of the derived word is rejected when the derived word is designated as the rejecting object by the output/reject information.

Figures 6A, 6B:
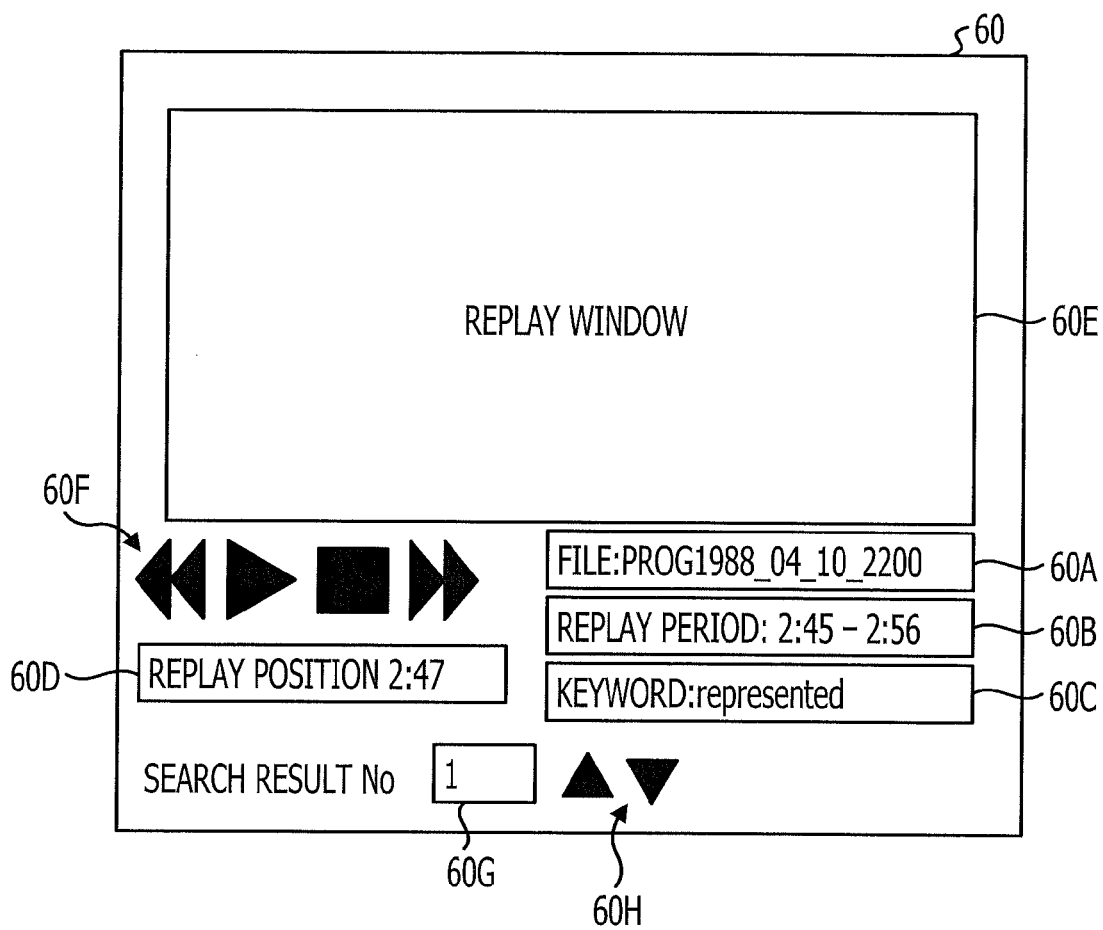
FIG. 6A is a schematic diagram illustrating an example of search result information.
FIG. 6B is a schematic view illustrating an exemplary image of a search result replay screen.

When the speech recognition processing ends, the result output section 22 displays the result output from the speech recognition section 20 on the display device (Operation 82). FIG. 6A illustrates an example of information to be output as the search result from the speech recognition section 20 to the result output section 22. FIG. 6A illustrates a case where the search result is output as information in CSV format. For every single word-spoken portion searched, information including parameters such as "FILE", "START", "END", "KEYWORD" and "SCORE" is set, where: "FILE" is information (video data file name) identifying a program (file) in the TV program DB 24; "START" is the replay start time of the detected word-spoken portion (elapsed time from the program start) and information representing a position on the time-line; "END" is the replay end time of the detected word-spoken portion (elapsed time from the program start) and information representing a position on the time-line; "KEYWORD" is a word (at least one of the search target word and the derived word) the utterance of which is detected; and "SCORE" is the evaluation value. The format of the search result is not limited to the CSV format and any other format may be used as long as information regarding which word is detected in which file and at which position is included as described above. It is preferable that the replay start time and the replay end time of the word-spoken portion are set to values corresponding to a period starting from several second—several minutes before the appearance of the detected word-spoken portion to several second—several minutes after the end of the detected word-spoken portion.

The result output section 22 displays the search result on the display device based on the above-described search result information. FIG. 6B illustrates an example of a search result display screen 60. The search result display screen 60 is provided with a display field 60A for the file name ("FILE"), a display field 60B for the replay start time ("START") and the replay end time ("END") of the detected word-spoken portion, a display field 60C for the detected word ("KEYWORD"), and a display field 60D for the current play time. Furthermore, the search result display screen 60 is also provided with a video replay window 60E, icons 60F for controlling start, stop, fast forward, etc. of the replay operation, and a display field 60G for the serial number assigned to each of the detected word-spoken portions. Furthermore, the search result display screen 60 is also provided with icons 60H to control switching of the word-spoken portion to be replayed by increasing or decreasing the serial number. The result output section 22 displays the search result by displaying the search result display screen 60 on the display device and corresponding information in the display fields 60A, 60B, 60C and 60G.

Next, the result output section 22 determines whether or not user's confirmation of the search result ends by detecting whether or not deletion of the search result display screen 60 is instructed by the user (Operation 84). When the determination in Operation 84 is negative, the result output section 22 further determines whether or not a replay of any word-spoken portion is instructed by detecting whether or not, of the icons 60F, an icon for starting of replay is operated by the user (Operation 86). When the determination in Operation 86 is also negative, the flow returns to Operation 82, and Operation 82 to Operation 86 are repeated.

When the user operates, of the icons 60F, the icon for instructing the start of replay, the determination in Operation 86 becomes positive. In this case, the result output section 22 determines that the replay of the word-spoken portion, regarding which the corresponding information are being displayed in the respective display fields 60A, 60B, 60C and 60G, is instructed, and executes a process of loading the corresponding video data from the TV program DB 24 and replaying the video. Accordingly, the video (moving picture) is played in the video replay window 60E in the search result display screen 60, and audio sound is reproduced for output from the audio output device. According to the above, the user may be able to confirm the video and the audio of the word-spoken portion (the portion where the designated search target word or the derived word generated from the designated search target word is spoken) regarding which the corresponding information are being displayed in the respective display fields 60A, 60B, 60C and 60G.

If the user wishes to confirm another word-spoken portion searched, the user operates the icon 60H and changes the serial number displayed in the display field 60G before operating the icon 60F to instruct the start of replay. According to the above, the video and audio of the word-spoken portion corresponding to the new serial number after the change are replayed, and therefore the user may be able to confirm any of the searched word-spoken portions by repeating the same operation. Furthermore, when the user finds the video he/she is looking for, the user may do some work such as clipping out the word-spoken portion of the search target word for editing, etc. The user may perform an operation to instruct the deletion of display of the search result display screen 60 when the confirmation of the search result ends. With that operation, the determination in Operation 84 becomes positive and the speech search processing ends.

Working of the first embodiment will now be described in detail using some examples. For example, when audio data is searched for a portion where the search target word "represent" is spoken by the use of speech recognition, not only a portion where only the word "represent" is spoken but also portions where derived words containing the search target word (for example "representation", etc.) are spoken are output as the search result in a typical existing technology. The typical existing technology does not discriminate the portion where the search target word is spoken from the portions where the derived words containing the search target word are spoken during the detection. Accordingly, it is difficult in the typical existing technology to exclude the portions where the derived words are spoken from the search result to be output.

On the other hand, in the first embodiment, the derived words of the search target word are generated and the generated derived words are also searched by the speech recognition. Accordingly, the first embodiment may enable to determine whether the detected word-spoken portion is for the search target word or for the derived word (usually, those portions are detected separately as the word-spoken portion of the search target word and as the word-spoken portion of the search target word). Furthermore, in the first embodiment, the derived word is accompanied with the output/reject information indicating whether the generated derived word is the outputting object or the rejecting object, and the word-spoken portion of the derived word that is the rejecting object is rejected even if it is detected as the word-spoken portion of the search target word. Accordingly, the first embodiment may enable to exclude the word-spoken portion of the unwanted derived word from the outputting objects.

For example as illustrated in FIG. 3A, the above arrangement may be realized by registering the setting designation information designating the derived word as the rejecting object in the table 34 of derived word generation rules by word class, with respect to "verb" that is the word class of the search target word "represent". Accordingly, for example as illustrated in FIG. 7A, the output/reject information corresponding to the derived words of the search target word "represent", which are registered in the second recognition dictionary 18, are all set to the rejecting objects. Subsequently, of the detected word-spoken portions of the search target word, the speech recognition section 20 rejects the portions detected as the word-spoken portions of the derived words such as "representation", etc. and outputs the portions where only the word "represent" is spoken as the search result.

Alternatively, two consecutive words "represent"+"tation" may be registered in the second recognition dictionary 30, and the speech recognition may be performed with a grammatical constraint that binds the recognition only in that word order. However, the utterance of phoneme is usually affected by neighboring phonemes before and after. Therefore, it is preferable to connect phonemes "t", "e", "i" to appropriate acoustic models by utilizing an acoustic limitation such that the phonemes "e" and "i" will follow the phoneme "t" when matching. For example, when a triphone model (phoneme model that considers phoneme background before and after) is used as the acoustic model, it is preferable to connect "t" to /n–t+e/ and "i" to /e–i+t/ for an exemplary case of "represent" (phoneme: r e p r i z e n t) and "-tation" (phoneme: t e i ʃ ə n) when the recognition accuracy is considered.

On the contrary, recognizing vocabulary such as "presentation", which allows using of a constraint condition such that "represent" is followed by "tation" as described above, is advantageous in view of the recognition accuracy since more information and constraints are available in comparison with the case of recognizing only "represent".

In the first embodiment, the derived words of the search target word may be divided into a group of the outputting objects and a group of the rejecting objects.

According to the above arrangement, for example as illustrated in FIG. 7B, of the derived words registered in the second recognition dictionary 18, a group of verb derived words is set as the rejecting object in the output/reject information, and a group of noun derived words is set as the outputting object in the output/reject information. Subsequently, of the detected word-spoken portions of the search target word, the speech recognition section 20 rejects the portions detected as the word-spoken portions of the verb derived words such as "representation", etc. Accordingly, the portions where only "represent" is spoken and the portion where the noun derived words such as "representative", etc. are spoken are output as the search result.

When "represent" of the first recognition dictionary 16 is registered as the word to be output in the second recognition dictionary 18, the speech recognition section 20 may be configured only with the second recognition dictionary 18, without using the first recognition dictionary 16.

Furthermore, in addition to the above, conjugation forms (for example, a plural form, past form, progressive form, etc.) of a word may be registered as the derived word generation rule and set as the outputting object, for example. According to such an arrangement, the word-spoken portions of words corresponding to the conjugation forms of the search target word may be detected without fail. For English language, however, there are many derived words in addition to conjugation forms of verb and plural forms of noun. For example, as derived words of the verb "respect", there are adjectives such as "respectable", "respectful" etc., adverbs such as "respectfully", etc. These forms may be registered as derived word generation rules and the rejecting objects. According to such an arrangement, it may be able to reduce the possibility of having portions, where the above derived words are spoken, mixed with the search result as noise (word-spoken portions of derived words to be excluded).

Accordingly to the above, it may be able to perform the speech recognition in which all the derived words of the search target word are set as the rejecting objects or part thereof are set as the rejection words. As a result, the noise mixture to the search result and the detection failure may be reduced and the accuracy of speech recognition may be improved.

A second embodiment of the disclosed technology will now be described. In the present embodiment, like reference numerals denote portions substantially similar or identical to those of the first embodiment, and the descriptions thereof are omitted.

Figure 8:
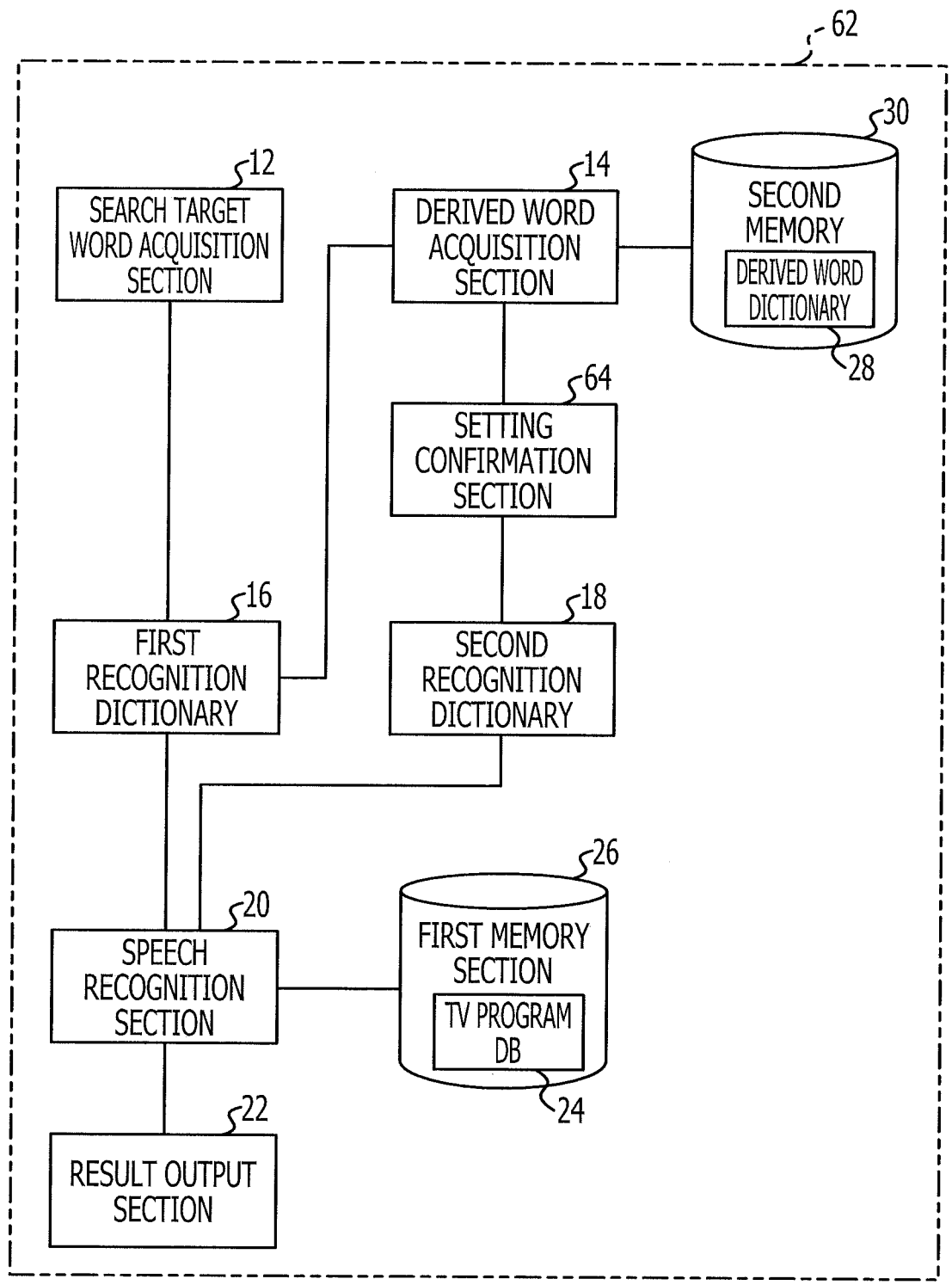
FIG. 8 is a schematic block diagram of a speech recognition device that will be described in a second embodiment.

FIG. 8 illustrates a speech recognition device 62 according to the second embodiment. The speech recognition device 62 is different from the speech recognition device 10 described in the first embodiment in having an additional constituent element, a setting confirmation section 64. The setting confirmation section 64 presents to the user the derived word of the search target word generated by the derived word acquisition section 14 and the output/reject information for each derived word set by the derived word acquisition section 14. Furthermore, when the user instructs to change the output/reject information with regard to the derived word presented, the setting confirmation section 64 changes the setting of the output/reject information of the derived word. Furthermore, when the user instructs to add the derived word, etc., the setting confirmation section 64 adds the derived word and sets the output/reject information corresponding to the derived word added.

Figure 9:
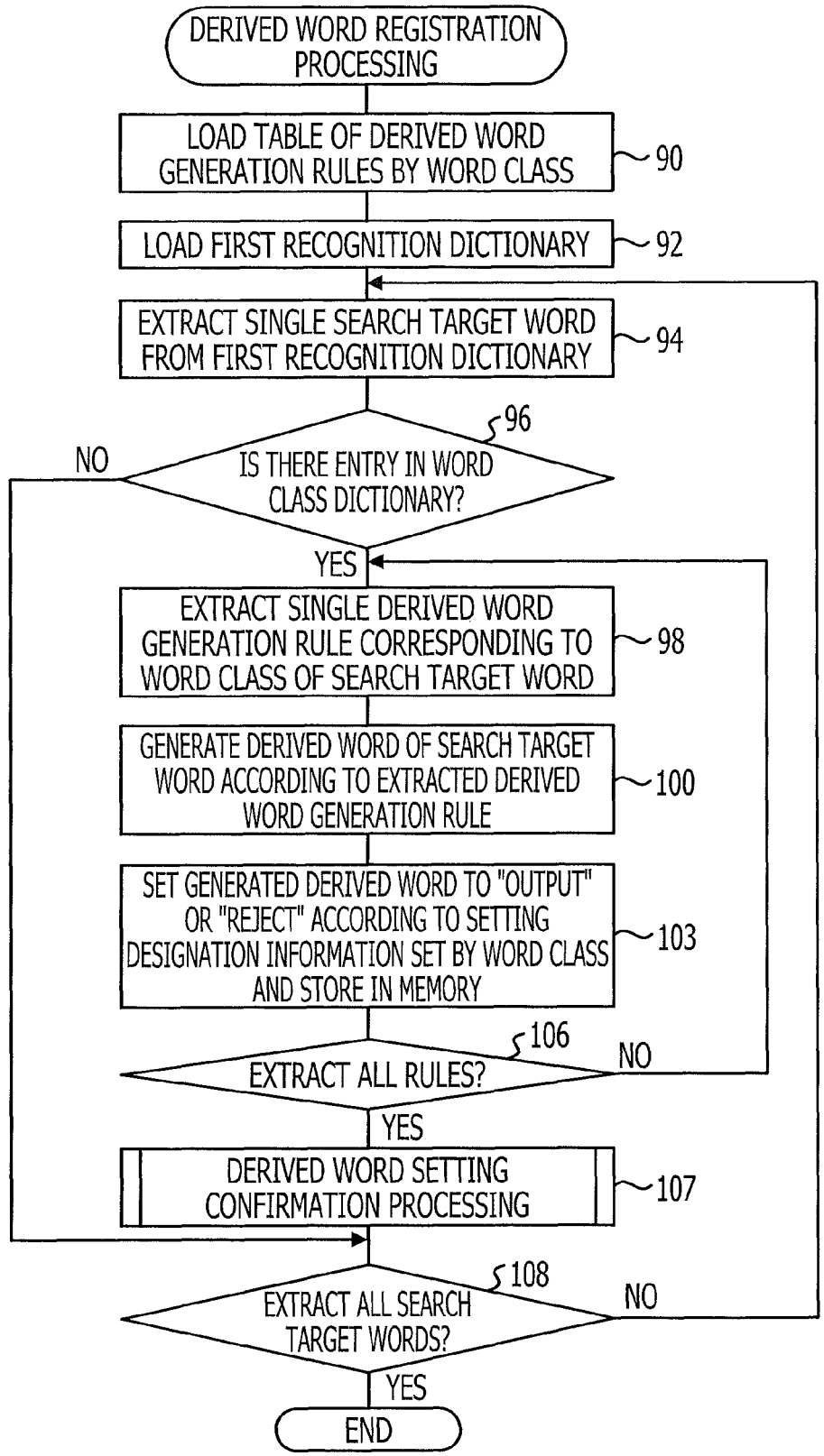
FIG. 9 is a flowchart of derived word registration processing that will be described in the second embodiment.

Derived word registration processing according to the second embodiment will now be described below with reference to FIG. 9, only on part that differs from the derived word registration processing (FIG. 5) described in the first embodiment. In the derived word registration processing according to the second embodiment, after generating the derived word of the search target word (Operation 100), the derived word acquisition section 14 sets the output/reject information according to the setting designation information (Operation 103) and stores the derived word in association with the corresponding output/reject information in the predetermined area of the memory 44. In the second embodiment, to provide ease of modification of the derived word generation rule described below, the derived word acquisition section 14 further stores in the memory 44 information for identifying the corresponding search target word and the derived word generation rule used for generating the derived word in association therewith.

Next, the derived word acquisition section 14 determines whether or not all the derived word generation rules, which correspond to the word class of the search target word that is the target of processing, are extracted from the table 34 of derived word generation rules by word class (Operation 106). When the determination is negative, the flow returns to Operation 98, and Operation 98 to Operation 106 are repeated until the determination in the Operation 106 becomes positive. Accordingly, in the derived word registration processing according to the second embodiment, every time the derived word is generated, the generated derived word, the output/reject information, and the information for identifying the search target word and the corresponding generation rule are stored and accumulated in the predetermined area of the memory 44 before being registered in the second recognition dictionary 18.

Figure 10:
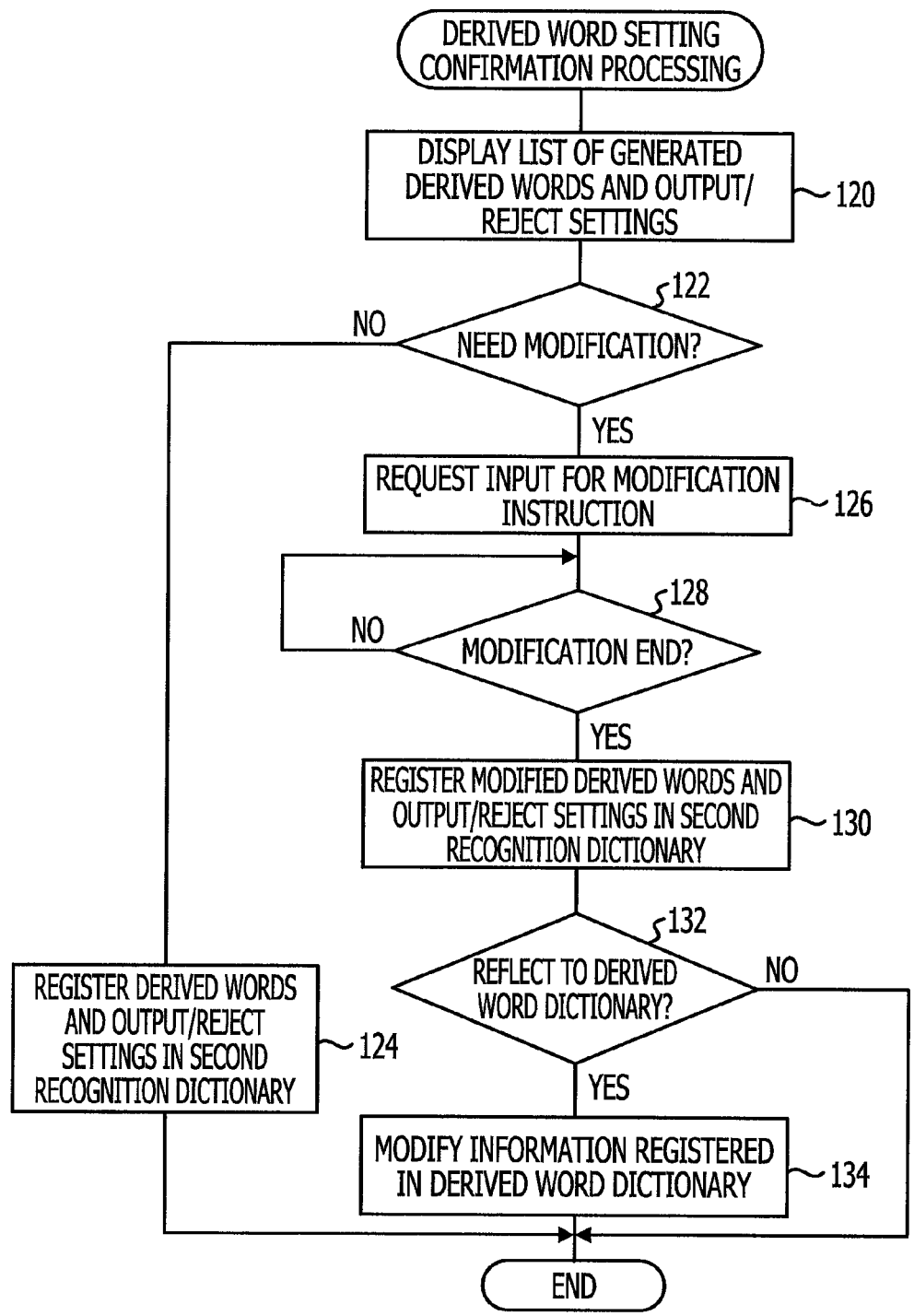
FIG. 10 is a flowchart of derived word setting confirmation processing.

When the determination in Operation 106 is positive, the setting confirmation section 64 executes the derived word setting confirmation processing (Operation 107). As illustrated in FIG. 10, in the derived word setting confirmation processing, the setting confirmation section 64 first displays on the display device a list of the derived words and the corresponding output/reject information stored in the predetermined area of the memory 44 (Operation 120). According to the above, the user may be able to confirm the derived words and the setting of "output" or "reject" for each of the derived words displayed in the display device, and to consider whether or not a change in the output/reject setting or a modification such as addition of the derived word is preferable to perform a more preferable search.

The user may input information indicating whether or not the modification is necessary via the input device when the user finishes the consideration. When the user inputs the information, the setting confirmation section 64 determines whether or not the modification of the derived word or the output/reject information is instructed as necessary (Operation 122). When the determination in Operation 122 is negative, the setting confirmation section 64 registers the derived words and the corresponding output/reject information stored in the predetermined area of the memory 44 in the second recognition dictionary 18 without any modification (Operation 124), and the derived word setting confirmation processing ends.

On the other hand, when the determination in Operation 122 is positive, the setting confirmation 64 prompts the user to modify the derived word or the output/reject information, for example, by displaying in the display device an additional message requesting the user to make a modification of the derived word or the output/reject information (Operation 126). Next, the setting confirmation section 64 determines whether or not the user's modification of the derived word or the output/reject information ends (Operation 128). The determination is repeated until the determination becomes positive.

During that period, the user may perform various operations on the input device such as an operation for changing the output/reject setting with regard to the derived word regarding which the change of the output/reject setting is determined as necessary; an operation for inputting the derived word, addition of which is determined as necessary; and an operation for setting the input derived word to the outputting object or the rejecting object, etc. The user performs an operation indicating the end of modification operation when the modification ends. When the user performs the operation indicating the end of modification operation, the determination in Operation 128 becomes positive. In this case, after being modified in response to the user's modification operation, the derived word and the corresponding output/reject information stored in the predetermined area of the memory 44 are registered in the second recognition dictionary 18 by the setting confirmation section 64 (Operation 130).

According to the above, for example, in an example illustrated in FIG. 7B where the user wishes to perform a search in which the verb derived words are set as the outputting objects and the noun derived words are set as the rejecting object, the user may be able to achieve a more preferable search by changing the output/reject setting of the individual group. Furthermore, according to the above, in the case where the user wishes to add a new derived word for example such as "represented", etc. as the rejecting object (or the outputting object), the user may be able to perform a more preferable search by entering the new derived word and setting it to the outputting object or the rejecting object.

For example, when the Japanese noun "hansamu (meaning: handsome)" is selected as the search target word for searching a video portion in which a "handsome" person appears, it is expected that the detection failure may be reduced if the corresponding Japanese adjective "hansamuna (meaning: handsome as adjective)" is also added as the derived word of the outputting object. In other words, if the adjective "hansamu-na" is not included in the list of derived words displayed on the display device, the user may perform an operation to add the adjective derived word "hansamu-na" as the outputting object. According to the above arrangement, the search accuracy may be improved. Furthermore, when the user performs an operation to add negative Japanese terms such as "hansamu-janai (meaning: not handsome)" as the rejecting object, it may be possible to reduce the chance of detection error in which a video without any handsome person is detected and further improve the search accuracy. The aforementioned " . . . na", " . . . janai", etc. are often used as the derived words. Accordingly, it is preferable to reflect the above (add the derived word generation rules for "+na", "+janai", etc.) to the derived word dictionary 28. The details will be described below.

Subsequently, the setting confirmation section 64 inquires the user as to whether or not the modification of the derived word and the output/reject information needs to be reflected in the derived word dictionary 28 by displaying an additional predetermined message on the display device. The setting confirmation section 64 determines whether or not the modification of the derived word and the output/reject information needs to be reflected in the derived word dictionary 28, based on information the user inputs through the input device in response to the inquiry (Operation 132).

When the user is inquired as to whether or not the modification needs to be reflected in the derived word dictionary 28, he or she determines if the current modification of the derived word or the output/reject information is specific to the current search or is a general modification that needs to be reflected in the next search and beyond. The user inputs information indicating "no reflection necessary" when the modification is determined as one that may be specific to the current search, or information indicating "the reflection necessary" when the modification is determined as one that may need to be reflected for the next search and beyond. When the user inputs the information indicating "no reflection necessary", the determination in Operation 132 becomes negative, and the derived word setting confirmation processing ends. In this case, no modification is reflected in the derived word dictionary 28.

When the user inputs the information indicating "reflection necessary", the determination in Operation 132 is positive, and the information registered in the derived word dictionary 28 is modified (Operation 134). The modification of the information registered in the derived word dictionary 28 may be performed by the setting confirmation section 64 or by the user. In the case where the setting confirmation section 64 modifies registered information of the derived word dictionary 28, the registered information to be modified may be identified based on the search target word and the information identifying the corresponding generation rule stored in the memory 44 in association with the derived words and the output/reject information. When the derived word is added, the generation rule may be generated based on a difference between the search target word and the added derived word. When the registered information of the derived word dictionary 28 is in text format, the setting confirmation section 64 may, for example, activate a text editor and display the registered information to be modified for the user's operation.

The large number of derived words may be generated for any individual word. Accordingly, it may be difficult to register in advance the generation rules that enable to generate the exhaustive list of the derived words at the time when the speech recognition device 62 starts to operate for the first time. On the other hand, by allowing the modification of the registered information of the derived word dictionary 28, it may be able to add a new generation rule, etc. as the necessity arises and to customize the registered information of the derived word dictionary 28 in response to the user's usage preference.

When a plurality of users uses the speech recognition device 62, a modification of the registered information in response to a different user may be stored as difference information for each of the plurality of users, without modifying the original registered information of the derived word dictionary 28. In this case, the generation of the derived word may be customized for each user without modifying the registered information of the derived word dictionary 28 by generating the derived word based on the registered information of the derived word dictionary 28 and the difference information corresponding to the current user.

Figure 11:
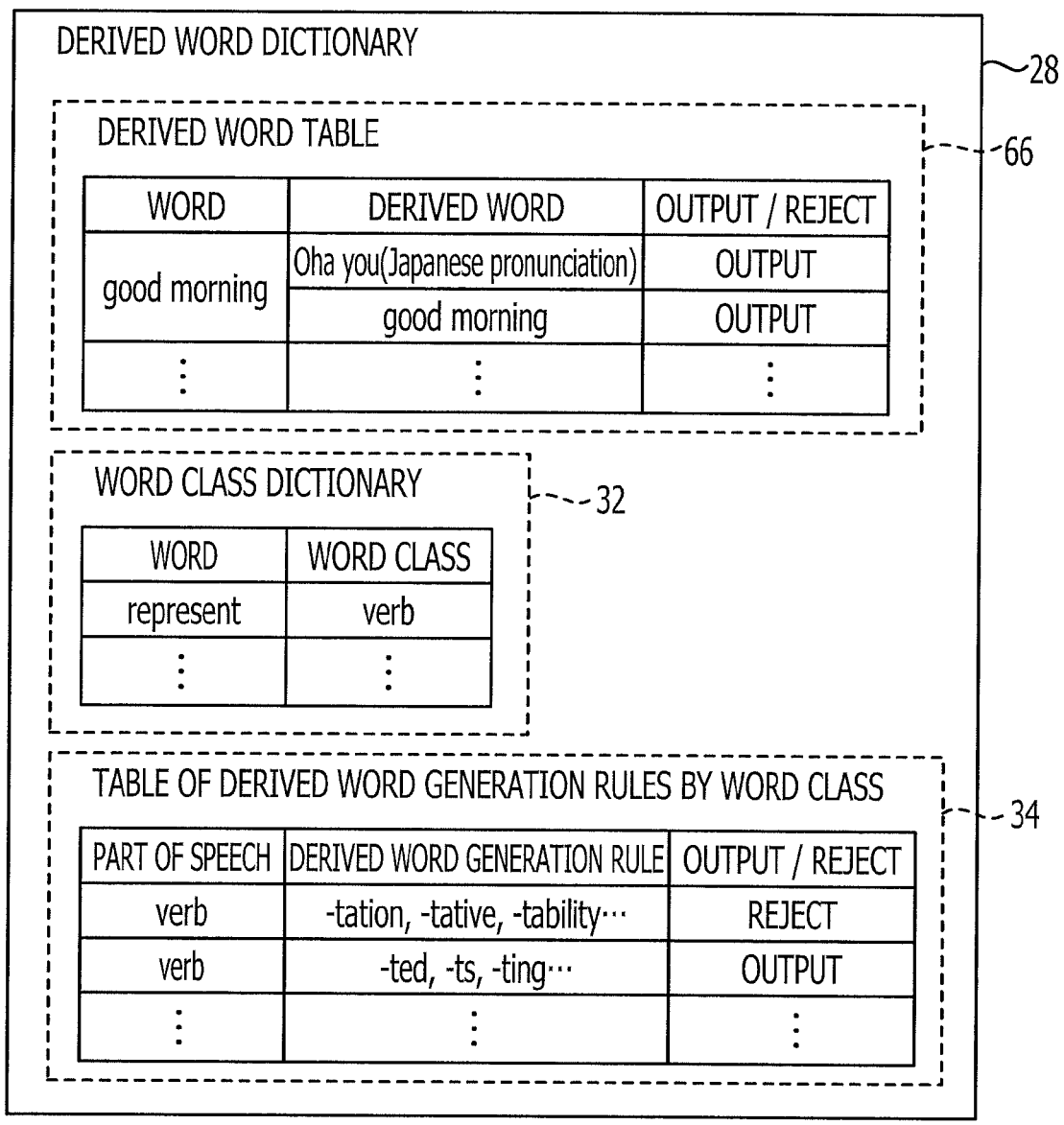
FIG. 11 is a schematic diagram illustrating an example of a derived word dictionary.

A third embodiment of the disclosed technology will now be described. In the present embodiment, like reference numerals denote portions substantially similar or identical to those of the second embodiment, and the descriptions thereof are omitted. As illustrated in FIG. 11, in the third embodiment, a derived word table 66 is added to the derived word dictionary 28. In the derived word table 66, with respect to a plurality of words, one or more derived words are registered for each of the plurality of words, and the setting designation information designating the setting of "outputting object" or "rejecting object" is registered for each derived words registered.

Figure 12:
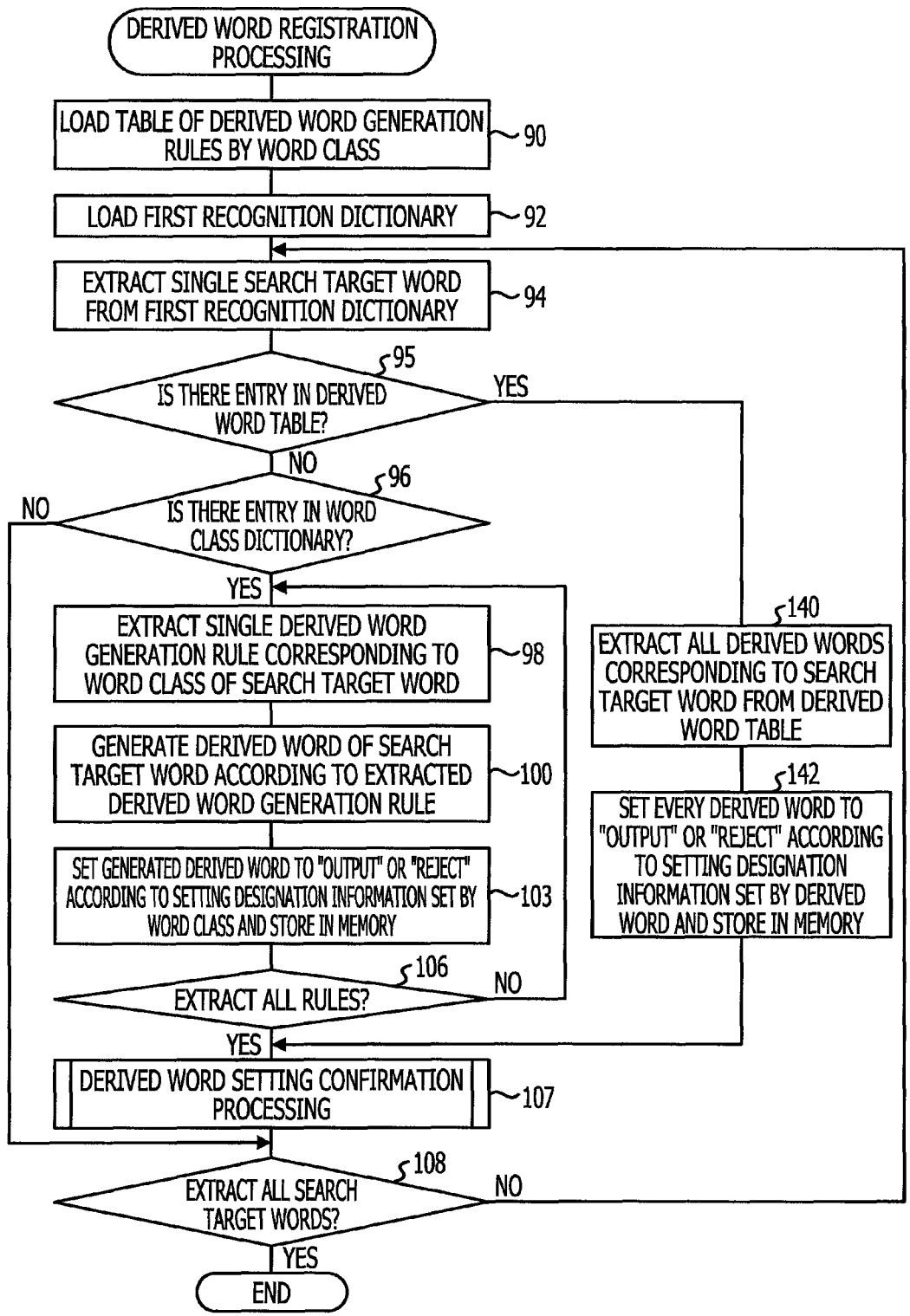
FIG. 12 is a flowchart of derived word registration processing that will be described in a third embodiment.

Derived word registration processing according to the third embodiment will now be described below with reference to FIG. 12, only on part that differs from the derived word registration processing (FIG. 9) described in the second embodiment. In the derived word registration processing according to the third embodiment, after extracting a single search target word from the first recognition dictionary 16 as the target of processing (Operation 94), the derived word acquisition section 14 conducts a search on the derived word table 66 using the extracted search target word, which is the target of processing, as the search key. Subsequently, based on the result of search, it is determined whether or not the search target word that is the target of processing is registered in the derived word table 66 (Operation 95). When the determination in Operation 95 is negative, the same processing as that in the second embodiment is performed. In other words, even in the case where the search target word that is the target of processing is not registered in the derived word table 66, the derived word may be generated based on the derived word generation rule corresponding to the word class of the search target word if the search target word is registered in the word class dictionary 32.

On the other hand, when the determination in Operation 95 is positive, the derived word acquisition section 14 extracts all the derived words registered in association with the search target word that is the target of processing from the derived word table 66 (Operation 140). Next, the derived word acquisition section 14 sequentially extracts the setting designation information registered in the derived word table 66 in association with each of the derived words extracted in Operation 140. Next, the derived word acquisition section 14 sets the output/reject information for each of the derived words extracted in Operation 140 according to the setting designation information extracted, and stores the derived words and the output/reject information in the predetermined area of the memory 44 (Operation 142). Subsequently, the setting confirmation section 64 performs the derived word setting confirmation processing described in the second embodiment (Operation 107).

In some languages such as English, the pronunciation of word may change not only at the end of the word but also in the stem when a noun changes to a plural form or a verb changes to a progressive form or a past form. If changes in the pronunciation were common to words that belong to a certain category, the derived word generation rule for those words could be formulated. However, there is a case where a form of the pronunciation change is unique only to a specific word such as the verb "see" which changes to "saw" in the past form. Accordingly, it may be difficult to formulate a rule for such pronunciation changes. Furthermore, it may also be difficult to formulate a rule for such a case where, for example, the derived word "good morning" in English, which is the same meaning but in a different language, is to be generated from the search target word "ohayogozaimasu (meaning: good morning)" in Japanese.

In the third embodiment, in light of the above, the derived word table 66 is added so as to make direct connections between the derived words and the corresponding words, for which the derived word generation rules may be difficult to formulate. Furthermore, when the search target word is registered in the derived word table 66, the derived words registered in association with the search target word may be read out for use. Accordingly, even such derived words, for which the formulation of rule is difficult, may be utilized as the outputting objects or the rejecting objects in the search. For example, as illustrated in FIG. 11, when words that are in different languages but have the same meaning are registered in pairs in the derived word table such as the Japanese search target word "ohayogozaimasu" and the corresponding English derived word "good morning". According to the above arrangement, it may be able to select the search target word in the language the user is familiar with even if the user doesn't know which language is being used. Furthermore, the use of the derived word table 66 may enable to use an abbreviated word in which part of search target word's letters is omitted as the derived word such as in the case where the search target word is "arigatogozaimasu (meaning: thank you)" or "thank you" and the derived word is "arigagto (meaning: thanks)" or "thanks", respectively. Furthermore, a synonym of the search target word may also be used as the derived word.

The speech recognition devices 10 and 62 described in the corresponding embodiments in the above may be advantageously used in, for example, a TV station to conduct a keyword search on videos broadcasted by the TV station in the past to find out a desired video. Furthermore, the TV station keeps audio sound of the videos broadcasted in the past as log. The speech recognition devices 10 and 62 may also be applicable for use in conducting a keyword search on that audio sound. In these embodiments, the speech recognition devices 10 and 62 may be configured with a computer connected to a computer network inside the TV station.

The speech recognition devices 10 and 62 may also be applicable for use in conducting a keyword search, etc. on moving picture data or audio data that is stored and accessible via the Internet. In such an embodiment, the speech recognition devices 10 and 62 may be configured with a server computer that is connected to the Internet and operable to conduct a speech search in response to a command sent from a client terminal, which is connected to the Internet, and return a result thereto. Alternatively, for example, a computer built in a recorder, which may be set in a home for recording TV programs, or a computer accessible to video data recorded in a recorder may be functioned as a speech recognition device according to the disclosed technology.

In the third embodiment, with regard to the search target word registered in the derived word table 66, there is described the embodiment that uses only the derived words registered in the derived word table 66. However, the derived word generated by the derived word generation rule may also be used together with the derived words described in the above.

Furthermore, in the above, there is described the embodiment such that the setting designation information, which designates the setting of "outputting object" or "rejecting object" with respect to the corresponding derived word, is registered in the derived word dictionary 28 and, according to the setting designation information, the derived word is set to the outputting object or the rejecting object. However, another embodiment may also be employed. For example, the derived word obtained by the derived word acquisition section 14 may be presented to a user, and the user may be allowed to set the derived word presented to either the outputting object or the rejecting object.

Furthermore, it is obvious that additional search conditions such as, for example, the range of dates may be used for the speech search in addition to the search target word and the derived word. Targeted audio data (video data) may be filtered using such additional conditions before performing the speech recognition.

Furthermore, the search target word and the derived word are not limited to a single word, but may also be a phrase or the like that includes a plurality of single words.

Furthermore, in the above, there is described the embodiment that set the derived word generation rule using the word class of the search target word as a unit. However, the unit for setting the derived word generation rule is not limited to the word class. For example, a category of "prefecture name" may be added. In such a case, the word "hyogo" may be stored in a dictionary such as the word class dictionary 32 or a similar dictionary in association with the category "prefecture name", and the derived word generation rule "+ken" (meaning: prefecture) may be registered in the table 34 of derived word generation rules by word class as the derived word generation rule for words whose category is the "prefecture name". In this example, when the word "hyogo" is entered as the search target word, the derived word "hyogo-ken" is generated and stored in the second recognition dictionary 18. Similarly, many rules may be set for generating composite derived words such as names of train stations, names of playgrounds, etc.

All of the publications, patent applications and technical standards recited herein are hereby incorporated by reference as if set forth in their entirety herein.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A speech recognition device comprising:
a processor; and
a memory which stores a plurality of instructions, which when executed by the processor, cause the processor to execute,
conducting a search, by speech recognition, on audio data stored in a first memory to extract wordspoken portions where plural words transferred are each spoken and, of the word-spoken portions extracted, rejects the word-spoken portion for the word designated as a rejecting object;
obtaining a derived word of a designated search target word, the derived word being generated in accordance with a derived word generation rule stored in a second memory or read out from the second memory where the derived word is stored in association with the search target word, and sets the derived word to an outputting object or the rejecting object according to setting designation information or a user's instruction, the setting designation information being stored in the second memory and indicating whether the derived word is the outputting object or the rejecting object;
transferring the derived word and the search target word to the conducting, the derived word being obtained and set to the outputting object or the rejecting object by the obtaining; and
outputting the word-spoken portion extracted and not rejected in the search of the conducting,
wherein the derived word generation rule is generated based on a difference between the search target word and a derived word that is stored in the second memory.

2. The device according to claim 1,
wherein the second memory stores the setting designation information for each of the derived word generation rules or for each of the derived words stored in the second memory, and
wherein the processor sets the derived word obtained to the outputting object or the rejecting object based on the setting designation information that is stored in the second memory and corresponds to the derived word.

3. The device according to claim 1,
wherein the second memory stores the setting designation information by type of word, the type being set for a word that is to be designated as the search target word, and
wherein the processor sets the derived word to the outputting object or the rejecting object based on the setting designation information that is stored in the second memory and corresponds to the type of the search target word designated.

4. The device according to claim 1,
wherein the processor presents the derived word, and sets the derived word presented to the outputting object or the rejecting object based on an instruction.

5. The device according to claim 1, further comprising:
presenting to a user the derived word and a result of the setting to the outputting object or the rejecting object, which is made by the processor with respect to the derived word, and changing the setting of the outputting object or the rejecting object with respect to the derived word as to which the user instructed changing the setting of the outputting object or the rejecting object.

6. The device according to claim 5,
wherein the second memory stores the setting designation information by the derived word generation rule or by the derived word stored in the second memory, and wherein the processor changes the setting designation information in response to the user's instruction, the setting designation information being stored in the second memory and corresponding to the derived word as to which the user instructed changing the setting of the outputting object or the rejecting object.

7. The device according to claim 1,
wherein the second memory stores the derived word generation rule by type of word and type identifying information, the type being set for a word that is to be designated as the search target word, the type identifying information identifying the type of a word that is to be designated as the search target word, and
wherein the processor identifies the type of the search target word based on the type identifying information stored in the second memory, and generates the derived word of the search target word in accordance with the derived word generation rule that corresponds to the type of the search target word identified.

8. The device according to claim 7,
wherein the second memory stores the derived words for a subset of words that are to be designated as the search target words, in association with respective words of the subset,
wherein the processor obtains the derived word of the search target word by
reading out the derived word stored in the second memory in association with the search target word when the derived word is stored in the second memory in association with the search target word, and
generating the derived word of the search target word in accordance with the derived word generation rule corresponding to the type of the search target word after identifying the type of the search target word when the derived word is not stored in the second memory in association with the search target word.

9. The device according to claim 1,
wherein the processor is configured to
calculate an evaluation value for evaluating a degree of matching between a pronunciation of a word for evaluation and audio sound in a portion to be evaluated, the portion being included in audio sound represented by the audio data, and
determine whether or not the portion to be evaluated is a portion where the word for evaluation is spoken based on whether or not the evaluation value calculated is equal to or larger than a threshold value, and
wherein the threshold value in a case where the derived word is used as the word for evaluation is set to less than that in a case where the search target word is used as the word for evaluation.

10. The device according to claim 1,
wherein the derived word is a word generated by adding an affix to the search target word, a word generated by removing an affix included in the search target word, a synonym of the search target word, a word having a same meaning but in a different language, a word being different in number from the search target word, or a word in a different tense from the search target word.

11. A speech recognition method comprising:
obtaining a derived word of a designated search target word, the derived word being generated in accordance with a derived word generation rule stored in a second memory section or read out from the second memory section where the derived word is stored in association with the search target word;
setting, by a processor, the derived word by the obtaining to an outputting object or a rejecting object according to setting designation information or a user's instruction, the setting designation information being stored in the second memory section and indicating whether the derived word is the outputting object or the rejecting object;
searching, by speech recognition, audio data stored in a first memory section to extract word-spoken portions where the search target word and the derived word are each spoken, the derived word being obtained by the obtaining and set to the outputting object or the rejecting object by the setting;
rejecting, of the word-spoken portions extracted by the searching, the word-spoken portion for the derived word that has been set to the rejecting object, and
outputting the word-spoken portion extracted by the searching and not rejected by the rejecting,
wherein the derived word generation rule is generated based on a difference between the search target word and a derived word that is stored in the second memory.

12. The method according to claim 11,
wherein the second memory section stores the setting designation information by the derived word generation rule or by the derived word stored in the second memory section, and
wherein the obtaining sets the derived word to the outputting object or the rejecting object based on the setting designation information that is stored in the second memory section and corresponds to the derived word by the obtaining.

13. The method according to claim 11,
wherein the second memory section stores the setting designation information by type of word, the type being set for a word that is to be designated as the search target word, and
wherein the obtaining further sets the derived word to the outputting object or the rejecting object based on the setting designation information that is stored in the second memory section and corresponds to the type of the search target word designated.

14. The method according to claim 11,
wherein the obtaining presents the derived word by the obtaining, and sets the derived word presented to the outputting object or the rejecting object based on an instruction.

15. The method according to claim 11, further comprising:
changing the setting of the outputting object or the rejecting object with respect to the derived word as to which a user instructed to change the setting of the outputting object or the rejecting object after presenting to the user the derived word by the obtaining and a result of the setting to the outputting object or the rejecting object, the setting being made with respect to the derived word by the obtaining.

16. The method according to claim 15,
wherein the second memory section stores the setting designation information by the derived word generation rule or by the derived word stored in the second memory section, and
wherein the changing changes the setting designation information in response to the user's instruction, the setting designation information being stored in the second memory section and corresponding to the derived word as to which the user instructed to change the setting of the outputting object or the rejecting object.

17. The method according to claim 11,
wherein the second memory section stores the derived word generation rule by type of word and type identifying information, the type being set for a word that is to be designated as the search target word, the type identifying information identifying the type of a word that is to be designated as the search target word, and
wherein the obtaining further identifies the type of the search target word based on the type identifying information stored in the second memory section, and generates the derived word of the search target word in accordance with the derived word generation rule that corresponds to the type of the search target word identified.

18. The method according to claim 17,
wherein the second memory section stores the derived words for a subset of words that are to be designated as the search target words, in association with respective words of the subset,
wherein the obtaining further obtains the derived word of the search target word by
reading out the derived word stored in the second memory section in association with the search target word when the derived word is stored in the second memory section in association with the search target word, and
generating the derived word of the search target word in accordance with the derived word generation rule corresponding to the type of the search target word after identifying the type of the search target word when the derived word is not stored in the second memory section in association with the search target word.

19. The method according to claim 11,
wherein the derived word is a word generated by adding an affix to the search target word, a word generated by removing an affix included in the search target word, a synonym of the search target word, a word having a same meaning but in a different language, a word being different in number from the search target word, or a word in a different tense from the search target word.

20. A non-transitory computer-readable storage medium storing a speech recognition program that causes a computer to execute a process comprising:
- obtaining a derived word of a designated search target word, the derived word being generated in accordance with a derived word generation rule stored in a second memory or read out from the second memory where the derived word is stored in association with the search target word;
- setting the derived word by the obtaining to either an outputting object or a rejecting object according to setting designation information or a user's instruction, the setting designation information being stored in the second memory and indicating whether the derived word is the outputting object or the rejecting object;
- searching, by speech recognition, audio data stored in a first memory to extract word-spoken portions where the search target word and the derived word are each spoken, the derived word being obtained by the obtaining and set to either the outputting object or the rejecting object by the setting;
- rejecting, of the word-spoken portions extracted by the searching, the word-spoken portion for the derived word that has been set to the rejecting object; and
- outputting the word-spoken portion extracted by the searching and not rejected by the rejecting,
wherein the derived word generation rule is generated based on a difference between the search target word and a derived word that is stored in the second memory.

\* \* \* \* \*